(12) United States Patent
Kumagawa et al.

(10) Patent No.: US 11,720,762 B2
(45) Date of Patent: Aug. 8, 2023

(54) BAGGAGE KEEPING SYSTEM

(71) Applicant: KUMAGAWA CO., LTD., Hyogo (JP)

(72) Inventors: Keiichi Kumagawa, Hyogo (JP);
Toshihiko Kume, Hyogo (JP)

(73) Assignee: KUMAGAWA CO., LTD., Hyogo (JP)

( * ) Notice: Subject to any disclaimer, the term of this patent is extended or adjusted under 35 U.S.C. 154(b) by 276 days.

(21) Appl. No.: 17/273,049

(22) PCT Filed: Sep. 5, 2018

(86) PCT No.: PCT/JP2018/032833
§ 371 (c)(1),
(2) Date: Mar. 3, 2021

(87) PCT Pub. No.: WO2020/049644
PCT Pub. Date: Mar. 12, 2020

(65) Prior Publication Data
US 2022/0414358 A1    Dec. 29, 2022

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ............... G06K 7/10366; G06K 19/0723
(Continued)

(56) References Cited

U.S. PATENT DOCUMENTS 10,460,837 B1 * 10/2019 LaBorde .......... G06K 19/07749
10,776,593 B1 *  9/2020 Verma ............... G06Q 10/0631
(Continued)

FOREIGN PATENT DOCUMENTS

JP    H07-228336 A    8/1995
JP    2002-338051 A   11/2002
(Continued)

OTHER PUBLICATIONS

International Search Report of PCT/JP2018/032833 dated Dec. 11, 2018.
(Continued)

*Primary Examiner* — Ahshik Kim
(74) *Attorney, Agent, or Firm* — IP Business Solutions, LLC (57) ABSTRACT

A baggage keeping system includes a passenger tag, a first baggage tag, a second baggage tag, a reader and a management device. The three tags have RFID, which wirelessly transmits information about the passenger or baggage. The passenger tag is given to the passenger, the first baggage tag is stored in the baggage inaccessibly by a third party and the second baggage tag is attached to the outside of the baggage. The reader reads information about the passenger or baggage from three tags at boarding the departure-side airport and at arriving the arrival-side airport. The management device registers the information about the passenger and baggage, wirelessly received from the reader, compares the wirelessly received the information, determines whether the information about the passenger and baggage matches each other or not, and when they match, are the genuine baggage and the genuine owner.

12 Claims, 7 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 2009/0040101 A1* | 2/2009 | Ani | ........................ | G06Q 10/08 |
| | | | | 342/357.61 |
| 2013/0241712 A1* | 9/2013 | Motley, III | ........ | G06K 7/10009 |
| | | | | 340/10.51 |
| 2020/0218899 A1* | 7/2020 | Lamont | ..................... | G06T 7/74 |
| 2021/0063564 A1* | 3/2021 | Vemury | ................ | G01S 13/887 |
| 2022/0207313 A1* | 6/2022 | Huijsing | .............. | B64D 11/003 |
| 2022/0378162 A1* | 12/2022 | Moton, Jr. | ................ | G06N 3/02 |

FOREIGN PATENT DOCUMENTS

| | | | |
|---|---|---|---|
| JP | 2014-96043 A | 5/2014 |
| JP | 2017-538182 A | 12/2017 |

OTHER PUBLICATIONS

Written Opinion of the International Searching Authority of PCT/JP2018/032833 dated Dec. 11, 2018.

\* cited by examiner

BAGGAGE KEEPING SYSTEM

BACKGROUND OF THE INVENTION

Field of the Invention

The present invention relates to a baggage keeping system, that is a baggage checking system, hereinafter explained as the baggage checking system, and more particularly to the baggage checking system capable of easily and reliably responding to theft due to illegal or unauthorized replacement of RFID tag.

Description of the Related Art

When passengers board passenger aircraft, there are restrictions on the number and/or size of baggage that can be carried on board into the passenger aircraft, and it is common to check non-regulated baggage at the baggage deposit counter of the departure-side airport. An ID tag as a checking card is attached to the baggage checked at the baggage deposit counter of the departure-side airport while a baggage exchange ticket is handed to the passenger.

Baggage checked at the baggage deposit counter of the departure side airport is stored in a dedicated baggage container, and the baggage container is stored in the container storage of the passenger aircraft, the baggage container is unpacked at the destination airport, and the stored baggage is delivered and transported to baggage reclaim area by the conveyor.

At the baggage reclaim area, when the passenger finds his or her baggage on the conveyor, the passenger picks up the baggage from the conveyor, the baggage reclaim officer matches the baggage ID tag with the passenger's redemption ticket, and is done to confirm the baggage is correct for the passenger.

In such a baggage checking system, the person in charge at the baggage reclaim office visually collates the ID tag of the baggage with the passenger's redemption ticket to confirm the owner of the baggage, which has caused many problems such as misplaced baggage, theft and forgotten baggage.

On the other hand, it has been proposed to deliver baggage by applying RFID (Radio Frequency Identification) capable of the information communication using the wireless communication means (Patent Document 1).

For example, at the departure-side airport, RFID tag is attached to the baggage and an IC card is given to the passenger, and at the arrival-side airport, the RFID tag of the baggage on the baggage conveyor is read to find the position on the conveyor and notify the passenger. The baggage checking system has been proposed that allows passengers to receive baggage quickly and accurately by collating the tag data with the IC card data (Patent Document 2).

PRIOR ART LITERATURE PATENT LITERATURE

Patent Document 1: JP-A H07-228336
Patent Document 2: JP-A 2014-96043

SUMMARY OF THE INVENTION

However, in the baggage checking system described in Patent Document 2, when the RFID tag is replaced with an illegal or unauthorized RFID tag during the transportation of the baggage, and if the IC tag corresponding to the illegal or unauthorized RFID tag is used, the baggage is easily stolen and it is difficult to detect the stolen baggage being carried.

It is an object of the present invention to provide the baggage checking system capable of easily and surely responding to theft due to the illegal or unauthorized replacement of RFID tags.

Technical Solution

A baggage checking system according to the present invention deposits baggage from the passengers of the aircraft at the departure-side airport and carries it into the aircraft, while at the arrival-side airport, the baggage is carried out from the aircraft and handed over to the passengers, includes:

a passenger tag having RFID which wirelessly transmits information about the passenger or baggage, is provided to the passenger, a first baggage tag having RFID which wirelessly transmits information about the passenger or baggage, is stored in the baggage inaccessibly by a third party, a second baggage tag having RFID which wirelessly transmit information about the passenger or baggage, is attached to the outside of the baggage, a reader reads information about the passenger or baggage from the user tag, the first baggage tag and the second baggage tag by wirelessly reception at boarding the departure-side airport and at arriving the arrival-side airport, and a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

A baggage checking system according to the present invention deposits baggage from the passengers of the aircraft at the departure-side airport and carries it into the aircraft, includes:

a passenger tag having RFID which wirelessly transmits information about the passenger or baggage, is provided to the passenger, a first baggage tag having RFID which wirelessly transmits information about the passenger or baggage, is stored in the baggage inaccessibly by a third party, a second baggage tag having RFID which wirelessly transmit information about the passenger or baggage, is attached to the outside of the baggage, a reader reads information about the passenger or baggage from the user tag, the first baggage tag and the second baggage tag by wirelessly reception at boarding the departure-side airport, and a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

A baggage checking system according to the present invention carries out the baggage from the aircraft and handed over to the passengers at the arrival-side airport, includes a passenger tag having RFID which wirelessly transmits information about the passenger or baggage, is provided to the passenger, a first baggage tag having RFID which wirelessly transmits information about the passenger or baggage, is stored in the baggage inaccessibly by a third party, a second baggage tag having RFID which wirelessly transmit information about the passenger or baggage, is attached to the outside of the baggage, a reader reads information about the passenger or baggage from the user tag, the first baggage tag and the second baggage tag by wirelessly reception at arriving the arrival-side airport, and a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

One of the features of the present invention is that a first baggage tag with RFID that wirelessly transmits information about the passenger or baggage is stored inside the baggage inaccessibly by a third party, and the information of the second baggage tag and the passenger tag outside the baggage is compared based on the information of the first baggage tag, and when the information of the first baggage tag matches the information of the second baggage tag and the passenger tag on the outside of the baggage, the baggage is considered to be genuine baggage and the owner of the passenger tag is considered to be the genuine owner of the baggage.

As a result, when the second baggage tag is illegally replaced, and even if the passenger tag corresponding to the illegal second baggage tag is used, it can be determined that the owner of the baggage is not genuine, and it can respond quickly to baggage theft.

The baggage checking system according to the present invention may be further provided with a warning device, and the management device detects the baggage and/or the owner is not genuine whether match or not the mutual information about the passenger or baggage from the passenger tag, the first baggage tag and the second baggage tag received wirelessly by the reader, and when the baggage and/or the owner is not genuine, the warning device can be configured to receive a signal indicating not genuine from the management device and issue a warning.

When the information of the passenger tag, the first baggage tag and the second baggage tag are read by the reader, the status before baggage registration, during transportation and after delivery can be obtained as status information. By using the status information, it can be expected that the fraud of baggage and the owner will be known more reliably.

In other words, the management device detects whether the baggage is in the pre-registration status, in-transit status or post-delivery status depending on the passenger or baggage information by using the information of the passenger tag, the first baggage tag and the second baggage tag received wirelessly by the reader, and records the status information corresponding to the passenger or baggage information. When baggage with pre-registered status is found during baggage transportation, it can be determined to be a fraudulent tag, and the warning device can be configured to receive a signal from the management device and issue a warning.

The management device can determine that the passenger tag is an invalid tag when the passenger tag with a status before registration is detected from the passenger tags wirelessly received by the reader during transportation and after delivery, and the warning device can be configured to issue a warning.

The baggage checking system may be further provided with the reader carried by airport personnel, and the management device may detect the stolen baggage when the baggage with a status of being carried is found outside the carry-in and carry-out routes during baggage transport, the warning device issues a warning.

The baggage checking system may be provided with the reader installed at the airport exit, and the management device can determine that the passenger has get out from the airport illegally when the passenger tag and baggage are detected at the airport exit, so that the warning device issues a warning.

The management device can determine that the baggage is mis-delivered or lost baggage when the post-delivery status baggage is found in the transport route, and the warning device can issue a warning.

When the passenger tag with status after delivery is found in a place other than the carry-in route and the carry-out route, the management device can determine that a suspicious object has been taken away, and the warning device issues a warning.

When only baggage with post-delivery status is found at a place other than the carry-in route and the carry-out route, the management device can determine to be stolen baggage, and the warning device can issue a warning.

When the passenger tag with different passenger or baggage information is found outside the carry-in and carry-out routes with different status after delivery, the management device can determine that the baggage is wrong baggage or stolen baggage and the warning device can issue a warning.

Information about the passenger or baggage of the passenger tag, the first baggage tag and the second baggage tag include a serial number that identifies the passenger, and the feature amount of the passenger's face, the size, weight, color, volume, etc. of baggage captured with 3D camera.

BRIEF DESCRIPTION OF THE DRAWING

FIG. 5 (a) is a diagram showing an RFID reading operation in the above embodiment.

DETAILED DESCRIPTION OF THE INVENTION

The present invention will be described in detail based on examples shown in FIGS. 1 to 7 shown preferred embodiment of the baggage checking system according to the present invention. The baggage checking system of the preferred embodiment basically comprises of the passenger tag 10, the first baggage tag 11, the second baggage tag 12, the reader 13, the management device 14 and the warning device 15.

The passenger tag 10 is provided to the passenger and is in the form of an IC card, a boarding pass stub or a baggage exchange ticket, and the passenger tag 10 further has the RFID that wirelessly transmits information about the passenger or baggage, for example, a serial number.

The first baggage tag 12 is stored and locked inside the baggage 16 so that it cannot be accessed by a third party, and has the RFID that wirelessly transmits information about the passenger or baggage, for example, a serial number.

The second baggage tag 12 is attached to the outside of the baggage 16 and has the RFID that wirelessly transmits information about the passenger or baggage, for example a serial number.

The readers 13 are provided at the gate 20 of the baggage counter 18, the gate 22 of the transport conveyor 21, the loading path 19 to the aircraft 24 and the gate 23 of the loading port at the departure-side airport, and are provided at the gate 26 of the unloading conveyor 25 and a plurality of gates 27 to 31 of the baggage receiving conveyor 27 at the arrival-side airport, read the information about the passenger or baggage by wirelessly received from the passenger tag 10, the first baggage tag 11, and the second baggage tag 12.

The management device 14 registers information of the passenger or baggage, and the information of the passenger or baggage is transmitted from the passenger tag 10, the first baggage tag 11 and the second baggage tag 12 wirelessly received by the reader 13. The management device 14 determines whether they match each other or not, and when they match, determines that the baggage is genuine and the owner is genuine.

When the information regarding the passenger or the baggage does not match each other from the passenger tag 10, the first baggage tag 11 and the second baggage tag 12 wirelessly received by the reader 13, the management device 14 detect the baggage and/or the owner is unauthentic.

The warning device 15 issues a warning when the signal from the management device 14 indicating the baggage and/or the owner not genuine is received.

In addition, the management device 14 is wirelessly received the information about the passenger or baggage of the passenger tag 10, the first baggage tag 11 and the second baggage tag 12 from the reader 13, detects whether the baggage 16 is in the pre-registration status, in-transit status or post-delivery status, records it as status information corresponding to the information about the passenger or baggage and the tag is determined to be a fraudulent tag when the baggage 16 with the status before registration is found during transportation.

Further, the management device 14 is determined to be an invalid tag when the passenger tag 10 having the status before registration is detected from the passenger tag 10 wirelessly received by the reader 13 during transportation and after delivery.

The reader 13 may be carried by the airport staff, and the management device 14 determines that the baggage is stolen when the baggage 16 having the status of being transported is found at a place other than the carry-in route and carry-out route during the transportation of the baggage.

The reader 13 may be provided at the airport exit, and the management device 14 determines that the passenger has entered illegally when the passenger tag 10 and the baggage 16 are detected at the airport exit.

When the baggage 16 having the status after delivery is found in the transport route, the management device 14 determines that the baggage has been misdelivered or lost.

Further, when the passenger tag 10 having the status after delivery is found at a place other than the carry-in route and carry-out route, the management device 24 determines that the suspicious object has been left behind.

When only the baggage 16 having the status after delivery is found at a place other than the carry-in route and carry-out route, the management device 14 determines that the baggage is stolen.

Further, when the baggage 16 having different status of passenger or baggage information after delivery and the passenger tag 10 having different passenger or baggage information are found at a place other than the carry-in route and carry-out route, the management device 14 determines that the baggage is wrong or stolen baggage.

The warning device 15 issues a warning when it receives a signal from the management device 14 that the baggage or the passenger is not genuine.

Figure 1A:
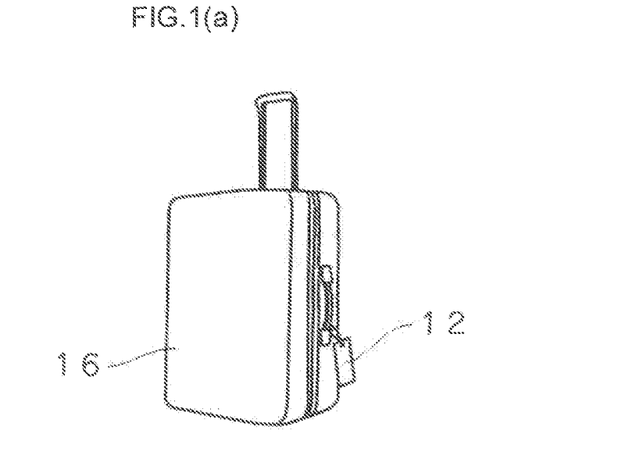
FIG. 1(a) is a schematic usage diagram of how to use the first and second baggage tags and passenger tags in a preferred embodiment of the baggage checking system according to the present invention.
Figure 1B:
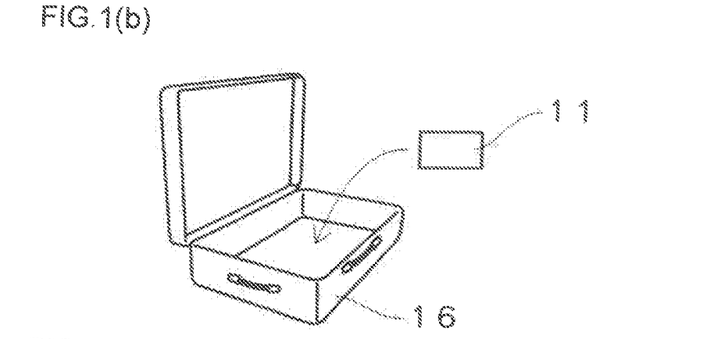
FIG. 1(b) is a schematic usage diagram of how to use the first and second baggage tags and passenger tags in a preferred embodiment of the baggage checking system according to the present invention.
Figure 1C:
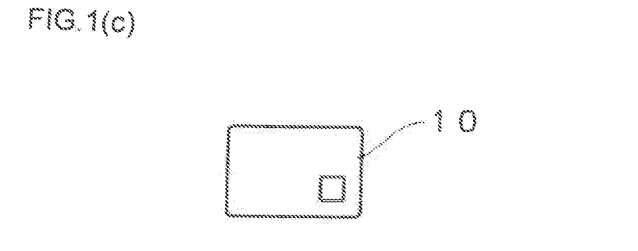
FIG. 1(c) is a schematic usage diagram of how to use the first and second baggage tags and passenger tags in a preferred embodiment of the baggage checking system according to the present invention.
Figure 2A:
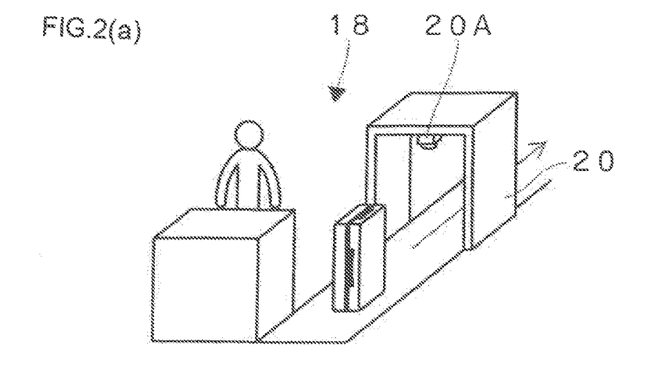
FIG. 2(a) is a diagram showing the work example at the departure-side airport in the above embodiment.
Figure 2B:
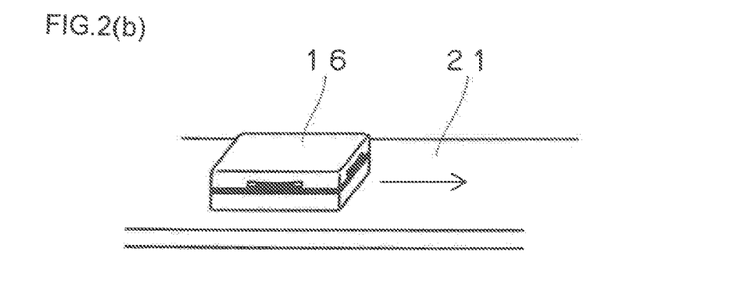
FIG. 2(b) is a diagram showing the work example at the departure-side airport in the above embodiment.
Figure 2C:
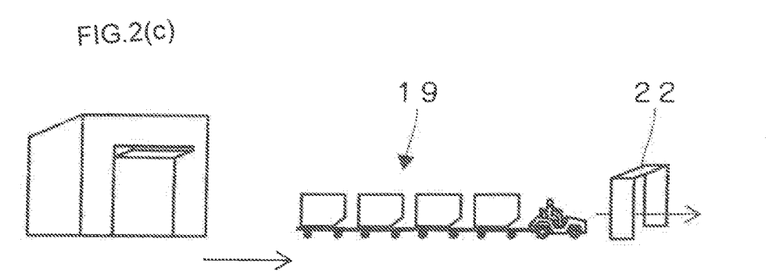
FIG. 2(c) is a diagram showing the work example at the departure-side airport in the above embodiment.
Figure 2D:
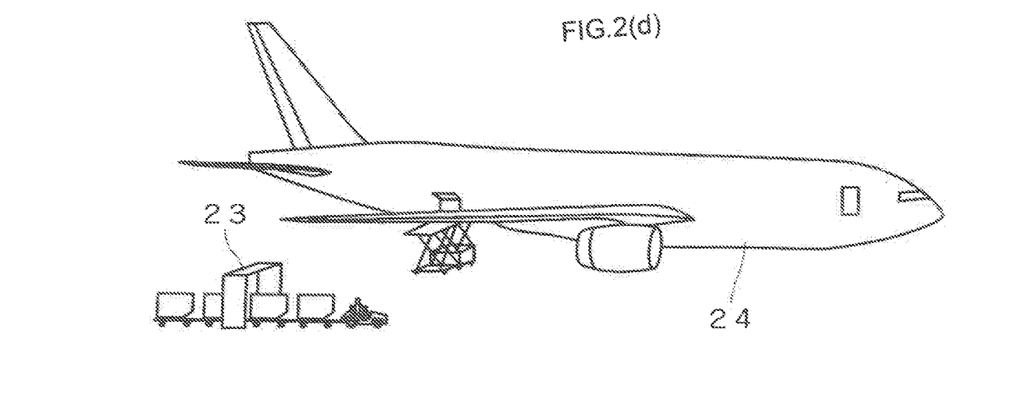
FIG. 2(d) is a diagram showing the work example at the departure-side airport in the above embodiment.

The baggage checking procedure will be described. When the passenger of the aircraft deposits his or her baggage in the baggage counter 18, the passenger tag 10, the first baggage tag 11 and the second baggage tag 12 on which the serial number is recorded, are handed to the passenger. The first baggage tag 11 is stored and locked in the baggage 16 as shown in FIG. 1 (b) and the second baggage tag 12 is locked at outside of the baggage 16, for example, tied to a handle as shown in FIG. 1 (a) and the baggage 16 is deposited at the baggage counter, while the passenger tag 10 is stored by the passenger.

The baggage 16 checked in at the baggage counter is transported by a conveyor as shown in FIG. 2, at which time the serial numbers of the first baggage tag 11 and the second baggage tag 12 are wirelessly read by using RFID at the gate 20. The read serial number is sent to the management device 14 and recorded. At this time, it is recorded that the baggage 16 is in the registration status. It is also possible to take an image of the baggage 16 by using a camera at the gate 20, for example, 3D camera 20A, and recorded the size, weight, color, volume, etc. of the baggage 16 together with the serial number.

The baggage 16 having the read serial number is transported to the transport vehicle by the transport conveyor 21, is carried to the carry-in entrance of the aircraft 24 by the transport vehicle, and is carried in and stored in the aircraft 24. When the baggage 16 are carried in at the gate 22 of the carry-in path 19 and at gate 23 of the carry-in entrance, the serial numbers of the first baggage tag 11 and the second baggage tag 12 are wirelessly read by using RFID at the gate 22 and the gate 23, and the read serial numbers are sent to the management device 14 and recorded, thereby the baggage 16 is recorded in storage status on the aircraft 24.

Figure 3A:
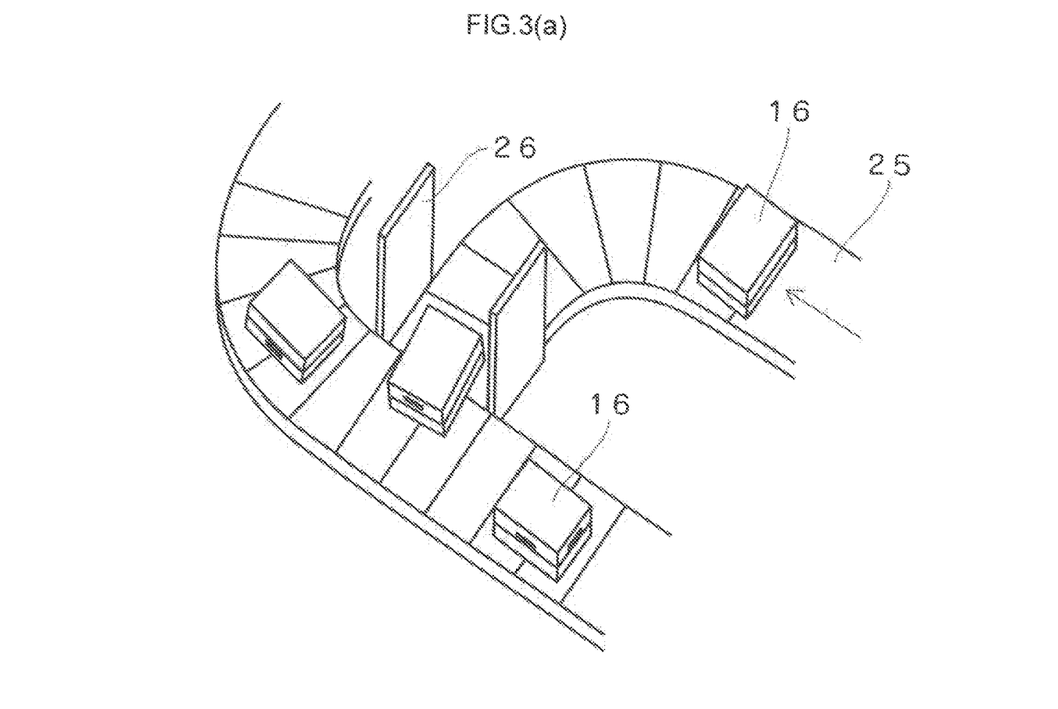
FIG. 3(a) is a diagram showing the work example at the arrival-side airport in the above embodiment.
Figure 3B:
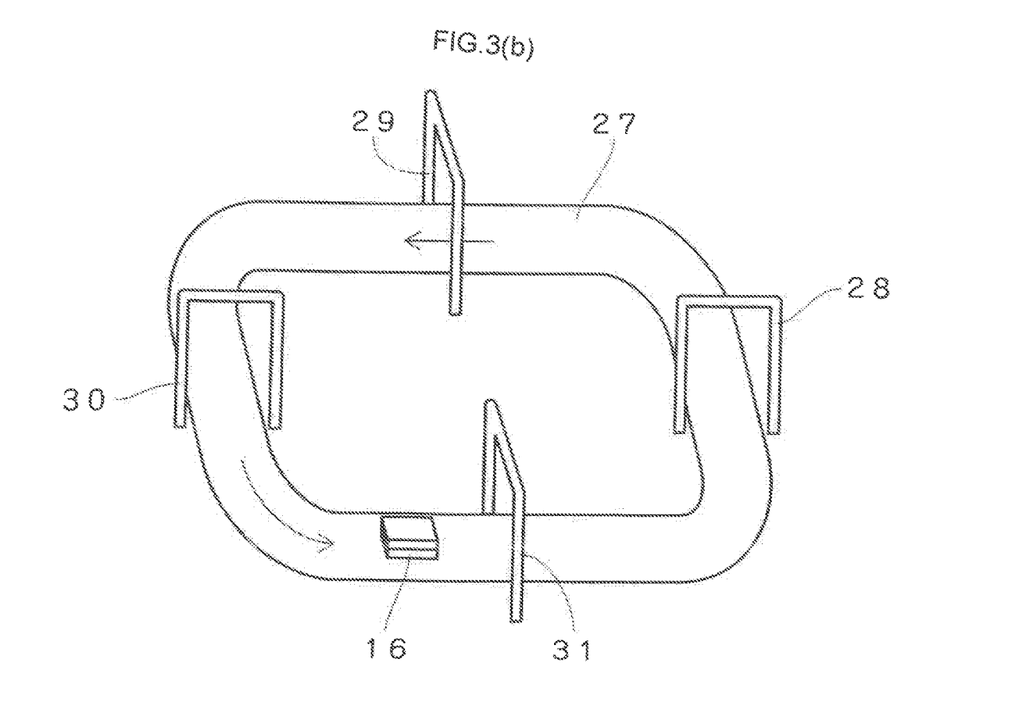
FIG. 3(b) is a diagram showing the work example at the arrival-side airport in the above embodiment.
Figure 4A:
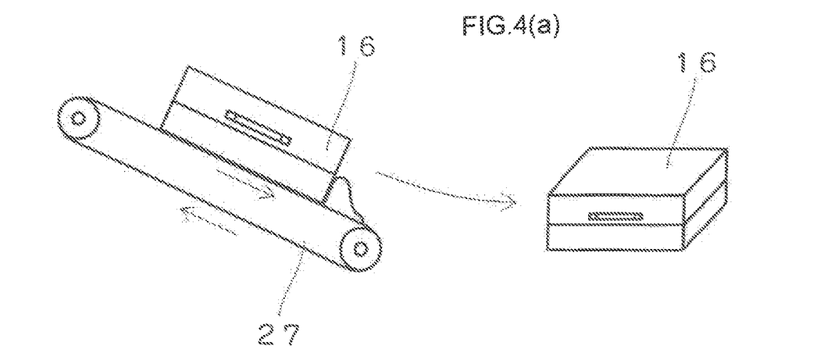
FIG. 4(a) is a diagram showing the work example of baggage delivery.
Figure 4B:
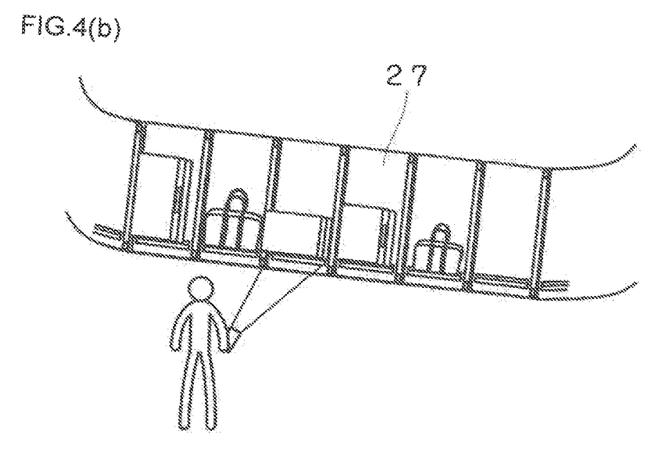
FIG. 4(b) is a diagram showing the work example of baggage delivery.
Figure 4C:
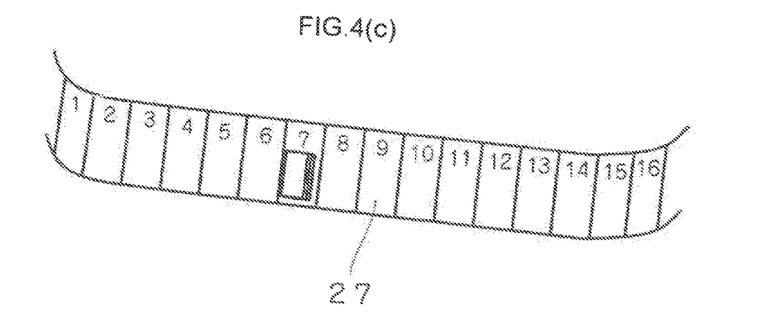
FIG. 4(c) is a diagram showing the work example of baggage delivery.
Figure 4D:
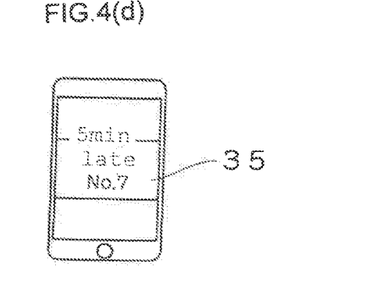
FIG. 4(d) is a diagram showing the work example of baggage delivery.
Figure 4E:
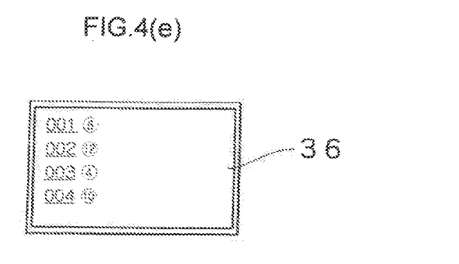
FIG. 4(e) is a diagram showing the work example of baggage delivery.
Figure 5A:
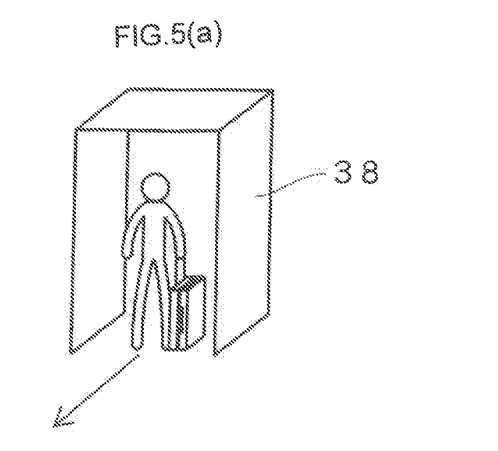
Figure 5B:
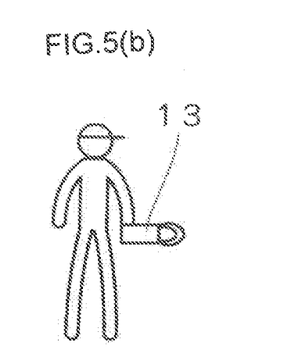
FIG. 5(b) is a diagram showing an RFID reading operation in the above embodiment.
Figure 5C:
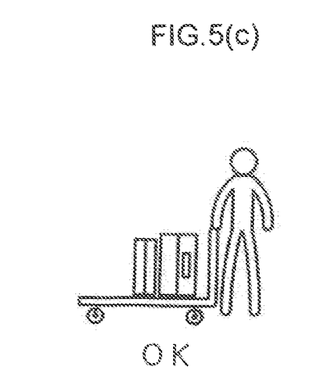
FIG. 5(c) is a diagram showing an RFID reading operation in the above embodiment.
Figure 5D:
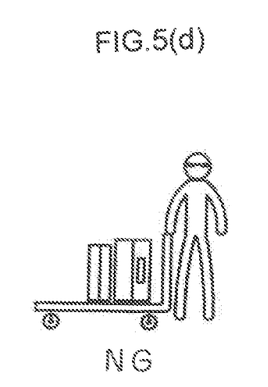
FIG. 5(d) is a diagram showing an RFID reading operation in the above embodiment.
Figure 5E:
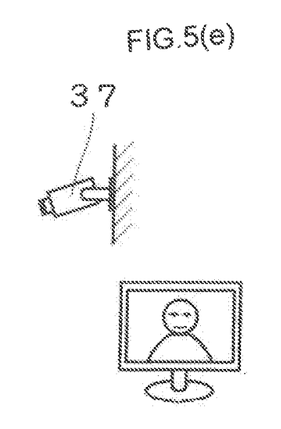
FIG. 5(e) is a diagram showing an RFID reading operation in the above embodiment.
Figure 6:
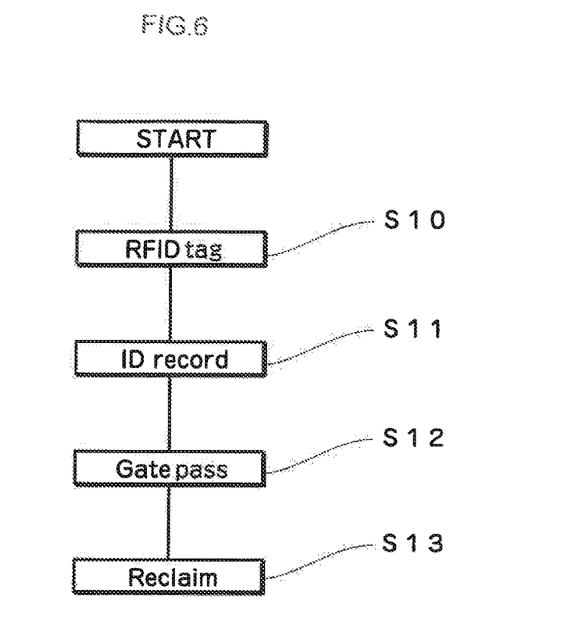
FIG. 6 is a diagram showing the work procedure in the above embodiment.
Figure 7:
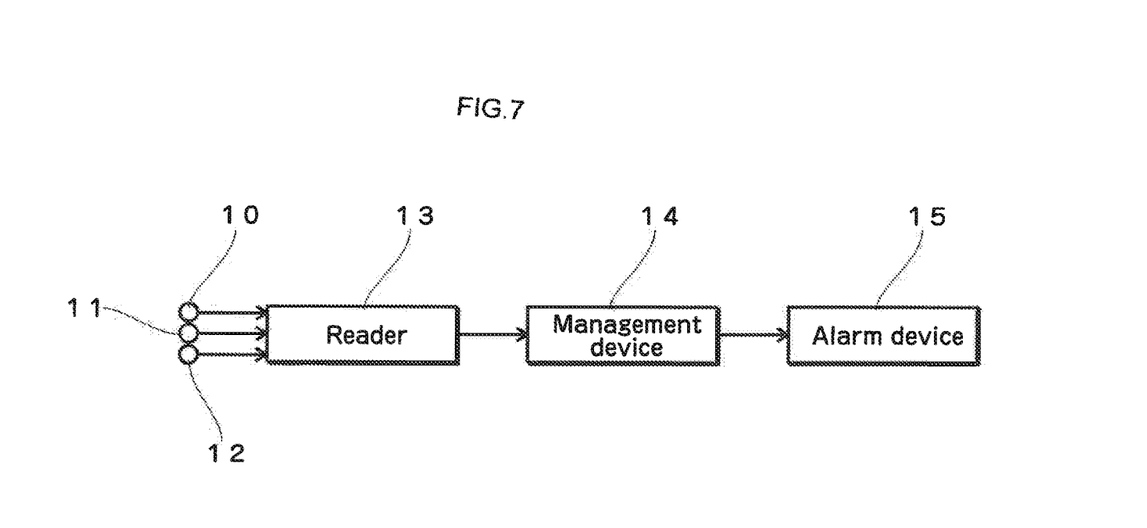
FIG. 7 is a diagram showing a functional block in the above embodiment.
Figure 8A:
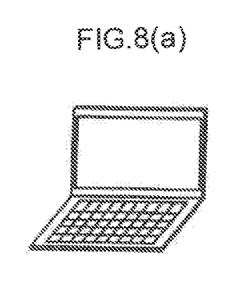
FIG. 8(a) is a diagram showing another embodiment.
Figure 8B:
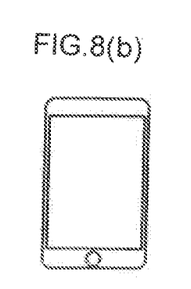
FIG. 8(b) is a diagram showing another embodiment.
Figure 8C:
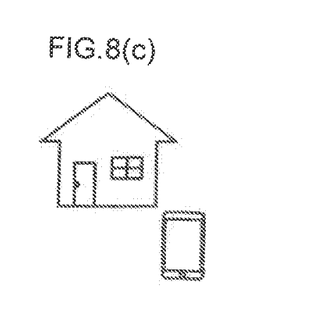
FIG. 8(c) is a diagram showing another embodiment.
Figure 8D:
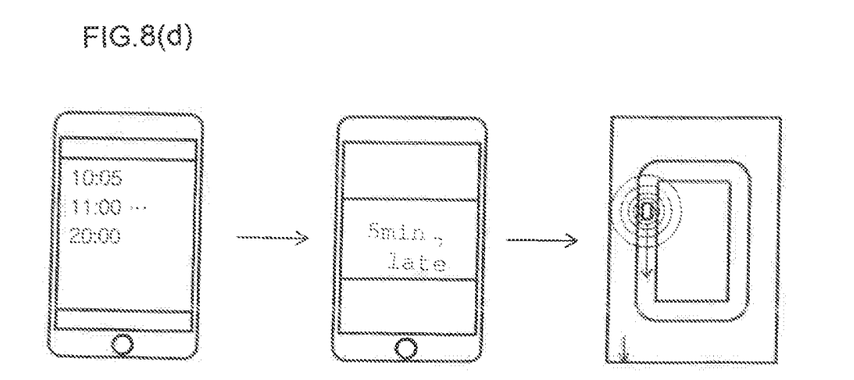
FIG. 8(d) is a diagram showing another embodiment.

When the aircraft 24 departs and arrives at the airport, the baggage 16 will be carried out from the air craft 24 and sent to the baggage reclaim conveyor 27 via the baggage reclaim conveyor 25, and passengers will pick up their baggage 16 at the baggage reclaim conveyor 27. The serial numbers of the first baggage tag 11 and the second baggage tag 12 are wirelessly read by using RFID at the gates 26, 28 to 31 of the carrying out conveyor 25 and the baggage receiving conveyor 27, and the location of the baggage 16 is detected, and the passenger is informed through the mobile terminal 35 or the display 36. The passenger can pick up the baggage 16 by wirelessly reading the serial number on the passenger tag 10 by using RFID to a nearby reader 13.

At this time, as shown in FIG. 4, the baggage receiving conveyor 27 may be divided into a plurality of sections, each section is configured to be tiltable in the lateral direction, and when the section of conveyor on which the own baggage 16 is mounted comes near the passenger, the section of conveyor is tilt and eject the baggage 16.

When the passenger receiving the baggage 16 passes through the unmanned gate 38 as shown in FIG. 5 (a), the serial numbers of the passenger tag 10, the first baggage tag 11 and the second baggage tag 12 can be read to confirm that the genuine baggage 16 has been handed over to the genuine owner.

Further, as shown in FIG. 5 (b), by the airport staff has the portable reader 13, as shown in FIGS. 5 (c) and 5 (d), they can detect and respond to fraudulent activities, for example, when passengers are carrying their baggage 16.

As shown in FIG. 5 (e), the face of the passenger can be photographed with the camera 39 to extract the facial features and used together with the serial number or in place of the serial number.

FIG. 8 shows a second embodiment. In the present embodiment, the serial numbers of the first baggage tag and the second baggage tag are read, and the time and status are transmitted from the management device to the personal computer shown in FIG. 8 (a) to be transmitted to the personal computer shown in FIG. 8 (d), and as shown in FIGS. 8 (b) and (c), the mobile terminal can be connected to a personal computer via an internet line at home to track the baggage. At the same time, the remaining time until the baggage is sent to the baggage receiving conveyor is displayed on the screen of the mobile terminal so that the baggage can be picked up with a short waiting time.

DESCRIPTION OF THE SIGN

10 Passenger tag
11 First baggage tag
12 Second baggage tag
13 Reader
14 Management device
15 Alarm device

The invention claimed is:

1. A baggage keeping system for depositing baggage from the passengers of the aircraft and carrying into the aircraft at the departure-side airport, while carrying out baggage from the aircraft and handed over to the passengers at the arrival-side airport, which comprises;
   a passenger tag having RFID which wirelessly transmits information about the passenger or baggage, is given to the passenger,
   a first baggage tag having RFID which wirelessly transmits information about the passenger or baggage is stored in the baggage inaccessibly by a third party,
   a second baggage tag having RFID which wirelessly transmits information about the passenger or baggage, is attached to the outside of the baggage,
   a reader reads information about the passenger or baggage from the user tag, the first baggage tag and the second baggage tag by wirelessly reception at boarding the departure-side airport and at arriving the arrival-side airport, and
   a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

2. A baggage keeping system for depositing baggage from the passengers of the aircraft and carrying into the aircraft at the departure-side airport, which comprises;
   a passenger tag having RFID which wirelessly transmits information about the passenger or baggage, is given to the passenger,
   a first baggage tag having RFID which wirelessly transmits information about the passenger or baggage is stored in the baggage inaccessibly by a third party,
   a second baggage tag having RFID which wirelessly transmits information about the passenger or baggage, is attached to the outside of the baggage,
   a reader reads information about the passenger or baggage from the user tag, the first baggage tag and the second baggage tag by wirelessly reception at boarding the departure-side airport, and
   a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

3. A baggage keeping system for carrying out baggage from the aircraft and handing over to the passengers at the arrival-side airport, which comprises;
   a passenger tag having RFID which wirelessly transmits information about the passenger or baggage, is given to the passenger, a first baggage tag having RFID which wirelessly transmits information about the passenger or baggage is stored in the baggage inaccessibly by a third party, a second baggage tag having RFID which wirelessly transmits information about the passenger or baggage, is attached to the outside of the baggage, a reader reads information about the passenger or baggage from the user tag, the first baggage tag and the second baggage tag by wirelessly reception at arriving the arrival-side airport, and a management device registers the information about the passenger and baggage, wirelessly receives the information of the passenger tag, the first baggage tag and the second baggage tag from the reader, compares the wirelessly received the information, determines whether the information about the passenger and baggage matches each other or not, and when they match, are the genuine baggage and the genuine owner.

4. The baggage keeping system according to claim 1, wherein further provided with a warning device, when the information about the passenger or baggage from the passenger tag, the first baggage tag and the second baggage tag wirelessly received by the reader does not match each other, the management device detects that the passenger and/or baggage is not genuine, and the warning device receives a signal from the management device indicating not genuine and issues a warning.

5. The baggage keeping system according to claim 4, wherein the management device uses the passenger tag, the first baggage tag and the second baggage tag wirelessly received by the reader to determine the baggage before registration, during transportation or after delivery based on the information about the passenger or baggage, detects that it is in one of the status and records it as status information corresponding to the information about the passenger or baggage, and when baggage having the status before registration is found during baggage transportation, it is detected as an invalid tag, and the warning device receives a signal from the management device indicating not genuine and issues a warning.

6. The baggage keeping system according to claim 4, wherein the management device determines that the tag is fraudulent when the passenger tag having pre-registration status is detected from information about the passenger tag wirelessly received by the reader during transportation and after delivery, and the warning device issues a warning.

7. The baggage keeping system according to claim 4, wherein the reader carried by airport staff is provided, the management device determines that the baggage is stolen when the baggage having a status of being transported is found in a place other than the carry-in route and the carry-out route during the transportation of the baggage, and the warning device issues a warning.

8. The baggage keeping system according to claim 4, wherein a reader is provided at the airport exit, the management device determines that the passenger has entered illegally when a passenger tag and baggage are detected at the airport exit, and the warning device issues a warning.

9. The baggage keeping system according to claim 4, wherein the management device determines the baggage is misdelivered or lost when the baggage having the status after delivery is found in the transportation route, and the warning device issues a warning.

10. The baggage keeping system according to claim 4, wherein the management device determines that the suspicious object has been left behind when the passenger tag having the status after delivery is found at a place other than the carry-in route and the carry-out route, and the warning device issues a warning.

11. The baggage keeping system according to claim 4, wherein the management device determines that the baggage is stolen when only the baggage with the status after delivery is found at a place other than the carry-in route and the carry-out route, and the warning device issues a warning.

12. The baggage keeping system according to claim 4, wherein the management device determines that the baggage is wrong baggage or stolen baggage when the baggage having different status after delivery and different passenger or baggage information and the passenger tag with different passenger or baggage information are found outside the routes of the carry-in and carry-out routes, and the warning device issues a warning.

* * * * *